(12) United States Patent
McDonald et al.

(10) Patent No.: US 7,873,461 B2
(45) Date of Patent: Jan. 18, 2011

(54) FUEL TEMPERATURE ESTIMATION IN A SPARK IGNITED DIRECT INJECTION ENGINE

(75) Inventors: Mike M. McDonald, Macomb, MI (US); Kenneth J. Cinpinski, Ray, MI (US)

(73) Assignee: GM Global Technology Operations, Inc.

( * ) Notice: Subject to any disclaimer, the term of this patent is extended or adjusted under 35 U.S.C. 154(b) by 143 days.

(21) Appl. No.: 12/272,176

(22) Filed: Nov. 17, 2008

(65) Prior Publication Data

US 2010/0125400 A1 May 20, 2010

(51) Int. Cl.
*F02D 41/34* (2006.01)

(52) U.S. Cl. .................. 701/104; 123/689; 73/114.45

(58) Field of Classification Search .......... 701/103, 701/104; 123/689; 73/114.45
See application file for complete search history.

(56) References Cited

U.S. PATENT DOCUMENTS

| | | | | |
|---|---|---|---|---|
| 4,402,294 A * | 9/1983 | McHugh et al. | ........... | 123/480 |
| 4,636,620 A * | 1/1987 | Wright et al. | ........... | 219/501 |
| 5,474,054 A * | 12/1995 | Povinger et al. | ........... | 123/689 |
| 5,865,158 A * | 2/1999 | Cleveland et al. | ........... | 123/478 |
| 6,148,800 A * | 11/2000 | Cari et al. | ........... | 123/490 |
| 6,518,763 B2 * | 2/2003 | Sollart | ........... | 324/378 |
| 7,054,772 B2 * | 5/2006 | Iannone et al. | ........... | 702/65 |
| 7,418,335 B2 * | 8/2008 | Barnes et al. | ........... | 701/103 |

* cited by examiner

*Primary Examiner*—Erick Solis

(57) ABSTRACT

A fuel control system that includes a fuel injector control module that selectively applies a power source to a coil of a fuel injector. The fuel control system also includes a current determination module that selectively measures current flowing through the coil. The fuel control system also includes a fuel temperature estimation module that selectively calculates a resistance of the coil based on the measured current and a voltage value of the power source and that determines an estimated fuel temperature based on the resistance. The fuel injector control module controls operation of a fuel system based on the estimated fuel temperature.

20 Claims, 5 Drawing Sheets

FUEL TEMPERATURE ESTIMATION IN A SPARK IGNITED DIRECT INJECTION ENGINE

FIELD

The present invention relates generally to fuel control systems and methods, and more particularly to fuel temperature estimation in fuel control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque that propels the vehicle. Airflow into the engine is regulated using a throttle. When a driver depresses an accelerator pedal, the throttle is commanded to open and allows air into the engine.

More specifically, the throttle adjusts a throttle area. As the throttle area increases, the airflow entering the engine increases. The throttle position is monitored by a throttle position sensor (TPS). A mass airflow (MAF) sensor monitors the amount of air entering the engine. An oxygen (O2) sensor monitors the air-fuel ratio of the engine exhaust. An engine coolant temperature (ECT) sensor monitors the engine coolant temperature. Based on signals from the TPS, the MAF sensor, the O2 sensor, and the ECT sensor, an engine control module controls the fuel injection system to achieve a desired amount of fuel to mix with the air entering each cylinder.

A fuel system typically includes a fuel tank, a fuel pump, a fuel rail, and fuel injectors. The fuel pump delivers fuel from the fuel tank to the fuel rail through a fuel line. An inlet portion of each of the fuel injectors receives fuel from the fuel rail and an outlet portion of each of the fuel injectors is connected to the engine.

The fuel injectors may inject fuel into an intake manifold at a central location or may inject fuel into the intake manifold at multiple locations, such as near the intake valve of each of the cylinders. Alternatively, the fuel injectors may inject fuel directly into the cylinders, referred to as direct injection. The injected fuel mixes with the air and creates the air-fuel mixture in the cylinders.

In a spark ignited (also referred to as spark ignition) engine, the air-fuel mixture combusts when a spark plug is energized. A spark actuator module enables the spark plug to be energized, which ignites the air-fuel mixture. The timing of the spark may be specified relative to the time when a piston in the cylinder is at its topmost position, referred to as top dead center (TDC), the point at which the air-fuel mixture is most compressed. The combustion of the air-fuel mixture drives the piston down, thereby driving a rotating crankshaft.

SUMMARY

A fuel control system that includes a fuel injector control module that selectively applies a power source to a coil of a fuel injector. The fuel control system also includes a current determination module that selectively measures current flowing through the coil. The fuel control system also includes a fuel temperature estimation module that selectively calculates a resistance of the coil based on the measured current and a voltage value of the power source and that determines an estimated fuel temperature based on the resistance. The fuel injector control module controls operation of a fuel system based on the estimated fuel temperature.

A method of controlling a fuel system including the steps of selectively applying a power source to a coil of a fuel injector, selectively measuring current flowing through the coil, and selectively calculating a resistance of the coil based on the measured current and a voltage value of the power source. The method further includes determining an estimated fuel temperature based on the resistance, and controlling operation of the fuel system based on the estimated fuel temperature.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
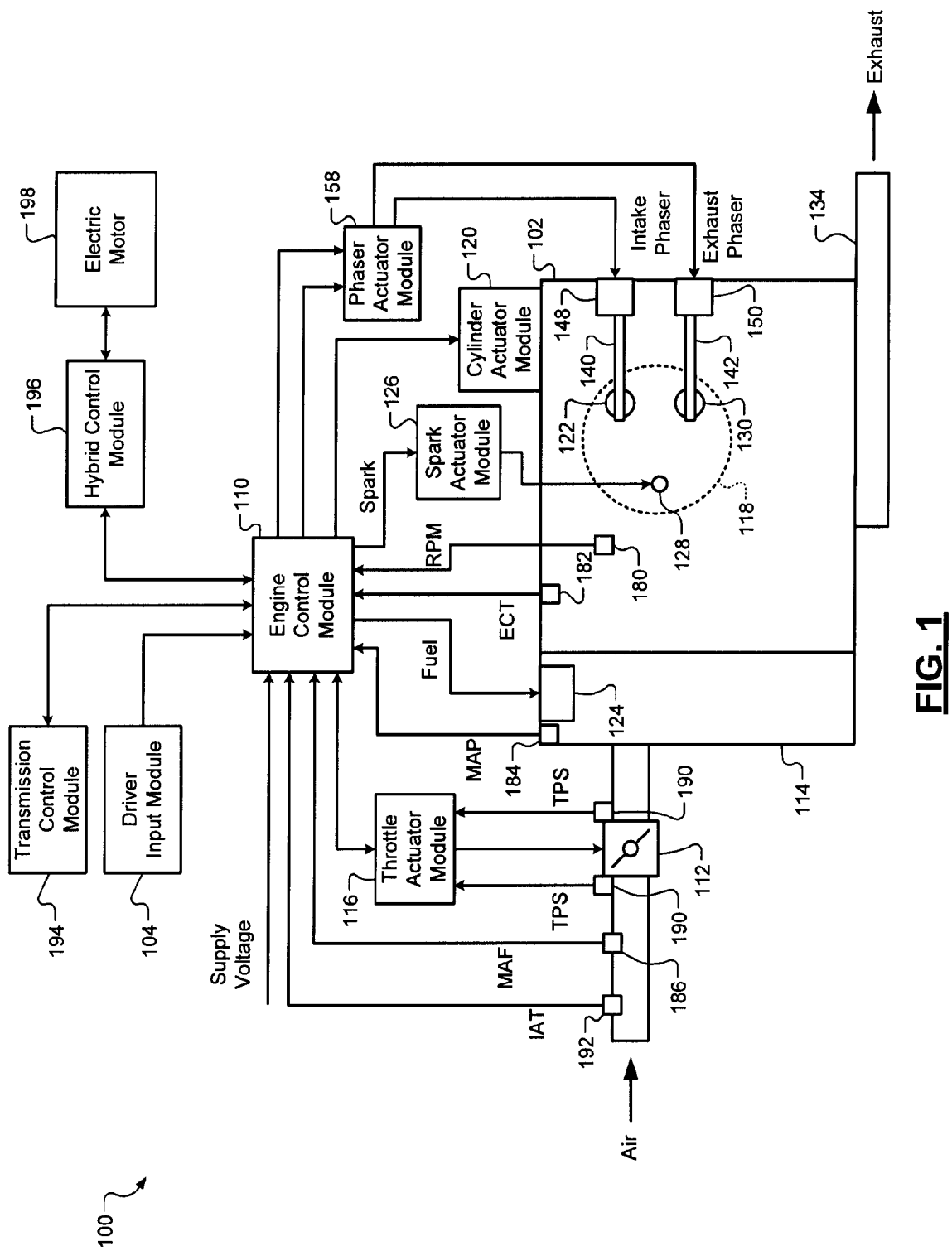
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An air-fuel ratio is a mass ratio of air to fuel present during combustion in an engine. When all of the fuel that is injected into the engine combines with all of the oxygen that is drawn into the engine during combustion, the mixture is chemically balanced and is referred to as a stoichiometric ratio. When the air-fuel mixture is imbalanced, engine performance may be reduced and engine emissions may be increased.

Engine control systems are capable of determining the mass of the air but do not determine the mass of the fuel. As such, when the engine control system determines how much fuel is required to combine with the air entering the engine, it does so based on volume. The mass of the fuel remains unknown. Therefore, the volume of fuel may have a mass that does not correspond to the mass of the air. When this occurs, the air-fuel mixture may be imbalanced.

The mass of the fuel may be determined based on the density and the volume of the fuel. The volume of the fuel may be determined based on the amount of time that the fuel injector is open (referred to as the fuel injector pulse width). The density of the fuel may be determined based on the temperature of the fuel. Temperature and density have a relationship such that as the temperature increases, the density decreases and as the temperature of the fuel decreases, the density of the fuel increases. Because a fuel injector coil is disposed within each of the fuel injectors, fuel temperature may be estimated based on a temperature of each of the fuel injector coils.

The temperature of each of the fuel injector coils may be determined after each of the fuel injectors has not been actuated for a predetermined period. Waiting the predetermined period allows each of the fuel injector coils to reach a thermal equilibrium. For example only, each of the fuel injectors may be selectively commanded off during a deceleration fuel cut-off (DFCO) mode, for example. After a thermal equilibrium is achieved, an engine control module may supply a predetermined voltage to each of the fuel injector coils. The predetermined voltage may be low enough to prevent each of the fuel injectors from opening. Thereafter, current flowing through each of the fuel injector coils can be measured.

The temperature of each of the fuel injector coils can be determined by calculating the resistance of each of the fuel injector coils. After the resistance of each of the fuel injector coils is determined, a fuel temperature may be estimated based on the resistance of each fuel injector coil using a look-up table, for example only.

The engine control module may control operation of the fuel system based on the estimated fuel temperature of each of the fuel injector coils. Alternatively, the estimated fuel temperature of each of the fuel injector coils can be averaged together to provide an average estimated fuel temperature. Based on either the estimated fuel temperature or an average estimated fuel temperature, the engine control module may determine the density of the fuel. Thereafter, the engine control module can determine the mass of the fuel based on the volume and the density of the fuel.

Referring now to FIG. 1, a functional block diagram of an exemplary engine system 100 is shown according to the principles of the present disclosure. The engine system 100 includes an engine 102 that combusts an air-fuel mixture to produce drive torque for a vehicle based on a driver input module 104. Air is drawn into an intake manifold 114 through a throttle valve 112. An engine control module (ECM) 110 commands a throttle actuator module 116 to regulate opening of the throttle valve 112 to control the amount of air drawn into the intake manifold 114.

Air from the intake manifold 114 is drawn into cylinders of the engine 102. While the engine 102 may include multiple cylinders, for illustration purposes, a single representative cylinder 118 is shown. For example only, the engine 102 may include 2, 3, 4, 5, 6, 8, 10, and/or 12 cylinders. The ECM 110 may instruct a cylinder actuator module 120 to selectively deactivate some of the cylinders to improve fuel economy.

Air from the intake manifold 114 is drawn into the cylinder 118 through an intake valve 122. The ECM 110 controls the amount of fuel injected by a fuel injection system 124. The fuel injection system 124 may inject fuel into the intake manifold 114 at a central location or may inject fuel into the intake manifold 114 at multiple locations, such as near the intake valve of each of the cylinders. Alternatively, the fuel injection system 124 may inject fuel directly into the cylinders 118.

The injected fuel mixes with the air and creates the air-fuel mixture in the cylinder 118. A piston (not shown) within the cylinder 118 compresses the air-fuel mixture. Based upon a signal from the ECM 110, a spark actuator module 126 energizes a spark plug 128 in the cylinder 118, which ignites the air-fuel mixture. The timing of the spark may be specified relative to the time when the piston is at its topmost position, referred to as to top dead center (TDC), the point at which the air-fuel mixture is most compressed.

The combustion of the air-fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate cylinders by disabling fuel and spark delivery and/or disabling the exhaust and/or intake valves.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 110. The engine system 100 may measure engine speed in revolutions per minute (RPM) using an RPM sensor 180. The temperature of the engine coolant may be measured using an engine coolant temperature (ECT) sensor 182.

The pressure within the intake manifold 114 may be measured using a manifold absolute pressure (MAP) sensor 184. In various implementations, engine vacuum may be measured, where engine vacuum is the difference between ambient air pressure and the pressure within the intake manifold 114. The mass of air flowing into the intake manifold 114 may be measured using a mass airflow sensor (MAF) 186. In various implementations, the MAF sensor 186 may be located in a housing with the throttle valve 112.

The throttle actuator module 116 may monitor the position of the throttle valve 112 using one or more throttle position sensors (TPS) 190. The ambient temperature of air being drawn into the engine system 100 may be measured using an intake air temperature (IAT) sensor 192. The ECM 110 may use signals from the sensors to make control decisions for the engine system 100.

The ECM 110 may communicate with a transmission control module 194 to coordinate shifting gears in a transmission (not shown). For example, the ECM 110 may reduce torque during a gear shift. The ECM 110 may communicate with a hybrid control module 196 to coordinate operation of the engine 102 and an electric motor 198. The electric motor 198 may also function as a generator, and may be used to produce electrical energy for use by vehicle electrical systems and/or for storage in a battery. In various implementations, the ECM 110, the transmission control module 194, and the hybrid control module 196 may be integrated into one or more modules.

Figure 2:
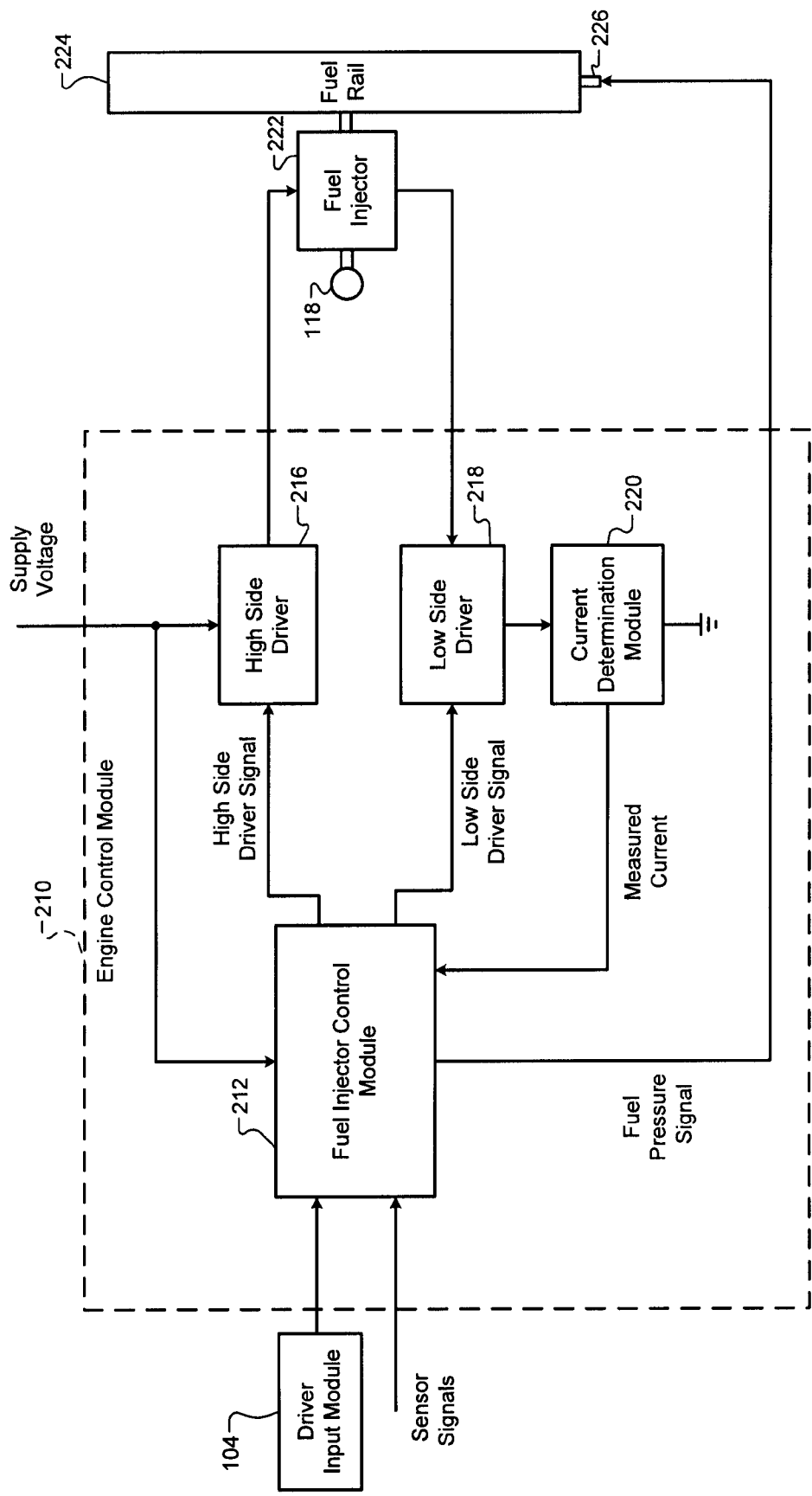
FIG. 2 is a functional block diagram of an exemplary engine control system according to the principles of the present disclosure.

With reference to FIG. 2, a functional block diagram of an exemplary engine control system is shown according to the principles of the present disclosure. An engine control module (ECM) 210 may include a fuel injector control module 212, a high side driver 216, a low side driver 218, and a current determination module 220. While multiple fuel injectors may be used in the engine 102, a single representative fuel injector 222 is shown for illustration purposes. Similarly, additional high and low side drivers may be used to control each additional fuel injector. A fuel rail 224 provides fuel to the fuel injector 222. A fuel pressure regulator 226 may be used to control the fuel pressure in the fuel rail 224.

The fuel injector control module 212 may control the fuel injector 222 based on a driver input signal and the sensor signals such as ECT, MAF, and TPS, for example only. The fuel injector control module 212 may selectively command engine cylinders on and off based on the driver input signal and the sensor signals. For example only, the cylinders may be commanded off by terminating fuel, spark, and/or air delivery to that cylinder. The fuel injector control module 212 may terminate fuel delivery by disabling the high and low side drivers 216 and 218 of the fuel injector 222, for example only.

When the fuel injector control module 212 enables the high side driver 216, a current flows to a coil (not shown) inside of the fuel injector 222. When the current flows through the coil, a magnetic field is created within the fuel injector 222. A fuel injector nozzle (not shown) is drawn toward the energized coil and fuel is allowed to flow from the fuel injector 222 into the engine 102. The current determination module 220 may receive the current flow and generate a measured current signal. The fuel injector control module 212 may receive the measured current signal and estimate the temperature of the fuel using a predetermined process.

The predetermined process may begin when the fuel injector control module 212 selectively turns off the fuel injector 222 based on the driver input signal and/or the sensor signals. For example, the fuel injector control module 212 may command the fuel injector 222 off when the vehicle begins to decelerate and enters a deceleration fuel cut-off (DFCO) mode.

The fuel injector 222 may also be commanded off when an active fuel management mode is enabled. In active fuel management mode, individual cylinders may be selectively disabled to reduce fuel consumption when the engine is operating under a predetermined load. Additionally, the fuel injector 222 may also be commanded off when the ECM 210 determines that the vehicle is in a stop-start state. For example only, in a mild hybrid vehicle, the engine 102 is shut off when the vehicle stops. When the engine 102 is shut off, the fuel injector 222 will not deliver fuel, which may reduce fuel consumption.

Figure 3:
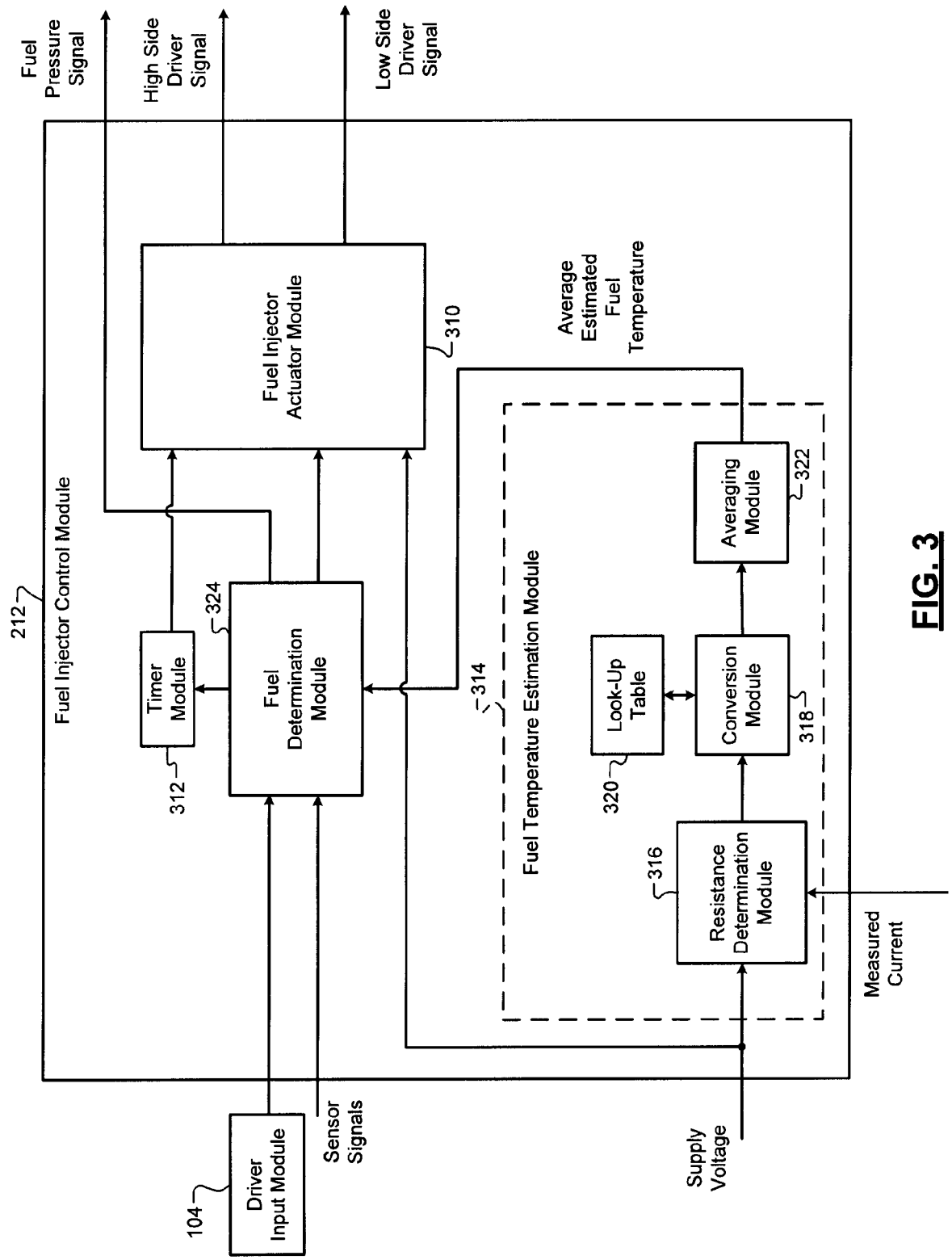
FIG. 3 is a functional block diagram of a fuel injector control module according to the principles of the present disclosure.

With reference to FIG. 3, a functional block diagram of a fuel injector control module is shown according to the principles of the present disclosure. The fuel injector control module 212 may include a fuel injector actuator module 310, a timer module 312, a fuel temperature estimation module 314, and a fuel determination module 324. The fuel injector actuator module 310 may control actuation of the fuel injector 222 based on a signal from the fuel determination module 324. For example, the fuel determination module 324 may command the fuel injector 222 to turn off based on the sensor signals and/or the driver input signal.

The fuel injector actuator module 310 may disable the high and low side drivers 216 and 218 to turn off the fuel injector 222. The high and low side drivers 216 and 218 may use pulse width modulation (PWM) to control power delivery to the fuel injector. Disabling the high and low side drivers 216 and 218 prevents the fuel injector 222 from receiving a supply voltage from a power source. When the fuel injector 222 is commanded to turn off, the timer module 312 may selectively generate a signal after the fuel injector 222 is off for a predetermined period. Waiting the predetermined period may allow a coil inside of the fuel injector 222 to reach a thermal equilibrium.

The fuel injector actuator module 310 may receive the signal and enable the high side driver 216 to deliver a predetermined voltage from the power source to the fuel injector 222. The predetermined voltage may not be enough to open the fuel injector 222. After the predetermined voltage reaches the coil in the fuel injector 222, the current determination module 220 may generate a measured current signal based on the current flowing from the coil. After the predetermined voltage reaches a steady-state, a resistance determination module 316 may calculate a fuel injector coil resistance. The fuel injector coil resistance may be determined based on the predetermined voltage and the measured current signal. Alternatively, the fuel injector control module 212 may measure the supply voltage rather than use a predetermined voltage.

A conversion module 318 may receive the fuel injector coil resistance and convert it to an estimated fuel temperature. The estimated fuel temperature may be converted using a look-up table 320. An averaging module 322 may receive the estimated fuel temperature corresponding to the fuel injector 222 and selectively average it with a temperature of other fuel injectors in the engine 102 and generate an average estimated fuel temperature signal.

When the fuel determination module 324 receives the average estimated fuel temperature signal, a corresponding density of the fuel can be determined. For example only, the fuel density can be found in a look-up table (not shown). After the density is determined, the fuel determination module 324 may selectively calculate the mass of the fuel based on the density and the volume of the fuel.

After the mass of the fuel is determined, the fuel injector control module 212 may selectively adjust the pulse width of the fuel injector 222 to adjust the volume of fuel being delivered to the engine 102. Alternatively, the fuel pressure regulator 226 may adjust the fuel pressure based on the average estimated fuel temperature signal while the pulse width remains unchanged. For example only, increasing the fuel pressure may increase the amount of fuel delivered to the cylinder 118 when the fuel injector 222 opens.

Figure 4:
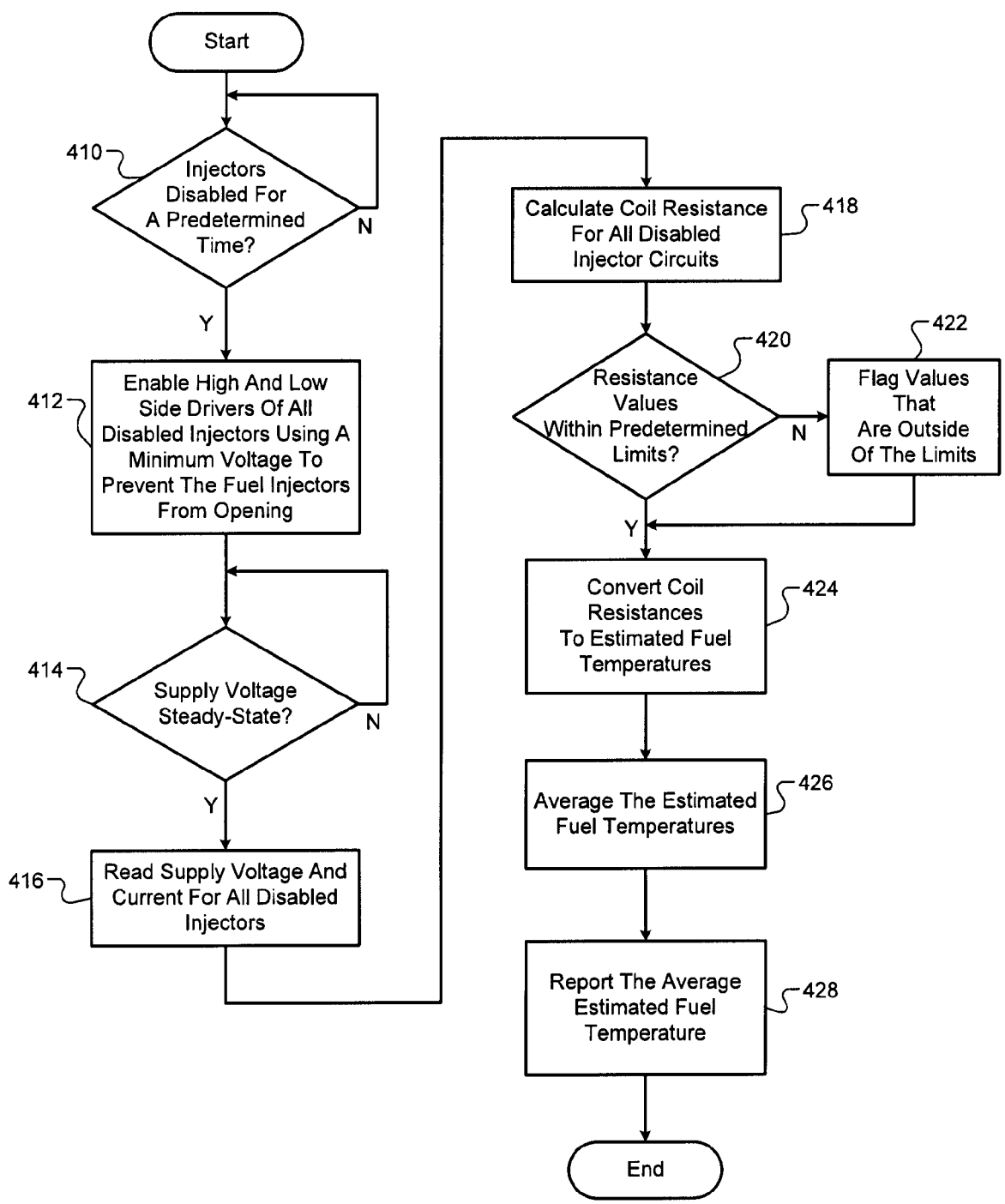
FIG. 4 is a flow diagram depicting exemplary steps to estimate fuel temperature according to the principles of the present disclosure.

With reference to FIG. 4, a flow diagram depicting exemplary steps to estimate a fuel temperature according to the principles of the present disclosure. In step 410, control determines whether the fuel injector 222 has been disabled for a predetermined time. If so, control continues in step 412. If control determines that the fuel injector 222 has not been disabled for the predetermined period, control remains in step 410. In step 412, control enables a high side and a low side driver 216 and 218 of each disabled fuel injector 222. In step 414, control determines whether a supply voltage is steady-state. If so, control continues in step 416. If not, control remains in step 414.

In step 416, control reads the supply voltage and a measured current from each disabled fuel injector 222. In step 418, control calculates a resistance for each disabled fuel injector 222 based on the supply voltage and measured current. In step 420, control determines if the resistance for each disabled fuel injector 222 is within a predetermined limit. If so, control continues in step 424. If not, control transfers to step 422.

In step 422, control may flag all resistance values that are not within the predetermined limits and control may transfer to step 424. In step 424, control converts the resistance for each disabled fuel injector 222 to an estimated fuel temperature. In step 426, control averages the estimated fuel temperature of each disabled fuel injector 222. In step 428, control generates an average estimated fuel temperature signal and control ends.

Figure 5:
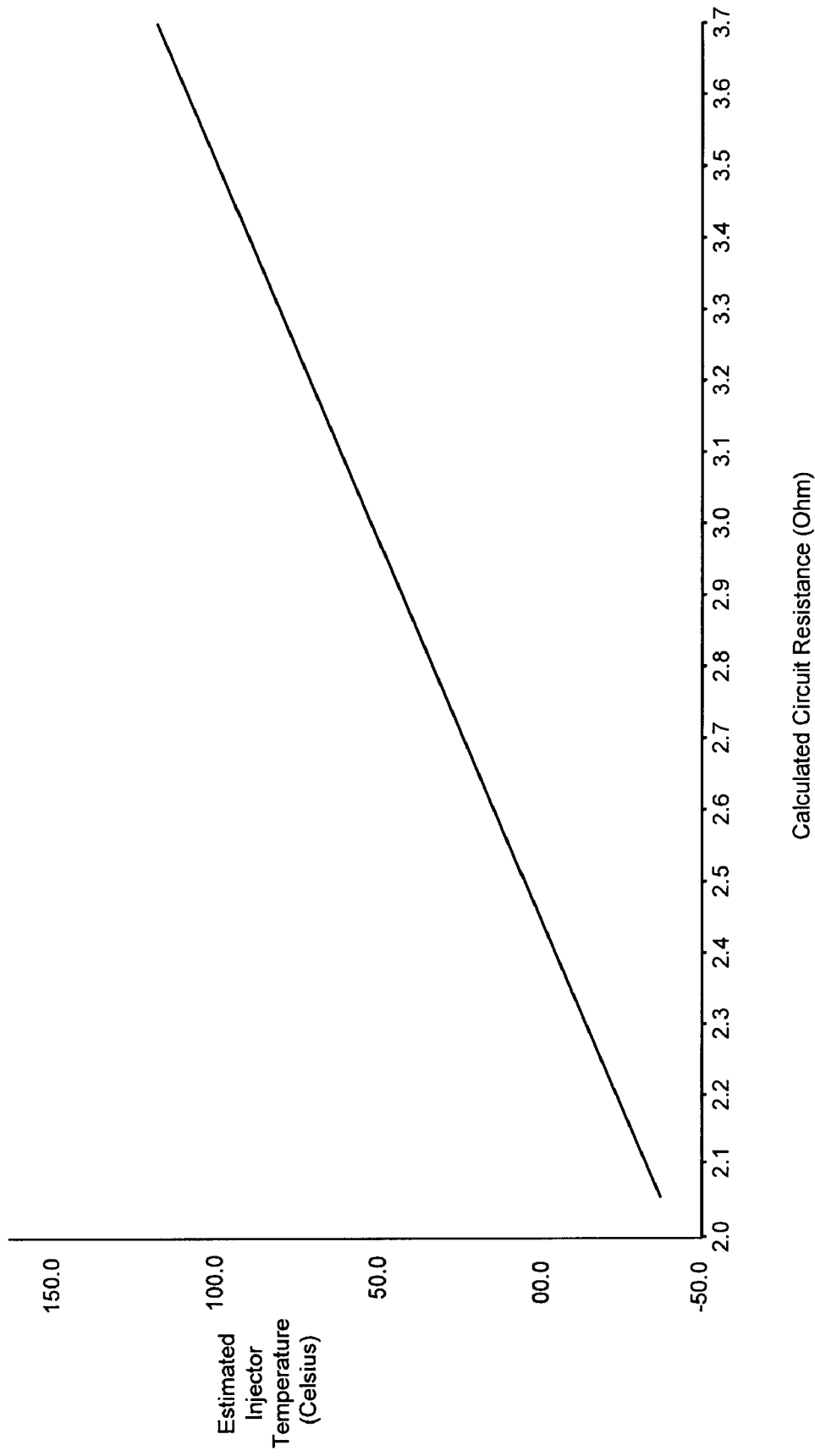
FIG. 5 is a chart used to find an estimated fuel temperature based on a fuel injector coil resistance according to the principles of the present disclosure.

With reference to FIG. 5, a chart is used to find an estimated fuel temperature based on a fuel injector coil resistance according to the principles of the present disclosure. An estimated fuel temperature can be determined by locating the estimated fuel temperature that corresponds to a calculated fuel injector coil resistance on the chart. Alternatively, the estimated fuel temperature may be looked up for each fuel injector coil using a look-up table. After the estimated fuel temperature of each fuel injector coil is determined, the estimated fuel temperatures may be averaged together. The fuel injector control module 212 may control operation of the fuel system based on the averaged estimated fuel temperature.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A fuel control system, comprising:
   a fuel injector control module that selectively supplies a current to a coil of a fuel injector during a period when the fuel injector is closed, wherein the supplied current is less than a current required to open the fuel injector;
   a current determination module that measures current-flowing through the coil; and
   a fuel temperature estimation module that calculates a resistance of the coil based on the measured current and a supply voltage, and that determines an estimated fuel temperature based on the calculated resistance,
   wherein the fuel injector control module controls the fuel injector based on the estimated fuel temperature.

2. The fuel control system of claim 1 wherein the fuel temperature estimation module determines a plurality of estimated fuel temperatures for a plurality of fuel injectors, respectively, and wherein the plurality of fuel injectors includes the fuel injector and the plurality of estimated fuel temperatures includes the estimated fuel temperature.

3. The fuel control system of claim 2 wherein the fuel injector control module generates an average estimated fuel temperature based on the plurality of estimated fuel temperatures, and that controls the fuel injector based on the average estimated fuel temperature.

4. The fuel control system of claim 1 wherein the fuel temperature estimation module uses a lookup table to calculate the resistance of the coil of the fuel injector based on the measured current and the supply voltage.

5. The fuel control system of claim 1 wherein before supplying the current to the fuel injector, the fuel injector control module disables the fuel injector for a predetermined period to allow the coil to reach a thermal equilibrium.

6. The fuel control system of claim 1 wherein the fuel injector control module selectively supplies the current to the fuel injector during a cylinder disable mode.

7. The fuel control system of claim 6 wherein the cylinder disable mode includes one of a deceleration fuel cut-off mode, an active fuel management mode, and a stop-start mode.

8. A method, comprising:
   selectively supplying a current to a coil of a fuel injector during a period when the fuel injector is closed, wherein the current is less than a current required to open the fuel injector;
   measuring current flowing through the coil;
   calculating a resistance of the coil based on the measured current and a supply voltage;
   determining an estimated fuel temperature based on the calculated resistance; and
   controlling the fuel injector based on the estimated fuel temperature.

9. The method of claim 8 wherein a fuel further comprising determining a plurality of estimated fuel temperatures for a plurality of fuel injectors, respectively, wherein the plurality of fuel injectors includes the fuel injector and the plurality of estimated fuel temperatures includes the estimated fuel temperature.

10. The method of claim 9 further comprising generating an average estimated fuel temperature based on the plurality of estimated fuel temperatures, and controlling the fuel injector based on the average estimated fuel temperature.

11. The method of claim 8 wherein calculating the resistance based on the measured current and the supply voltage includes using a lookup table.

12. The method of claim 8 further comprising before selectively supplying the current to the fuel injector, disabling the fuel injector for a predetermined period to allow the coil to reach a thermal equilibrium.

13. The method of claim 8 further comprising selectively supplying the current to the fuel injector during a cylinder disable mode.

14. The method of claim 13 wherein the cylinder disable mode includes one of a deceleration fuel cut-off mode, an active fuel management mode, and a stop-start mode.

15. The fuel control system of claim 1, wherein the fuel injector control module generates a pulse-width modulated (PWM) control signal for the fuel injector having a period based on the estimated fuel temperature.

16. The fuel control system of claim 1, wherein the fuel injector control module controls a pressure of fuel supplied to the fuel injector based on the estimated fuel temperature.

17. The fuel control system of claim 1, wherein the fuel injector control module increases an amount of fuel injected by the fuel injector when the estimated fuel temperature is greater than a first threshold, and decreases the amount of fuel injected by the fuel injector when the estimated fuel temperature is less than a second threshold, wherein the second threshold is less than the first threshold.

18. The method of claim 8, wherein controlling the fuel injector includes generating a pulse-width modulated (PWM) control signal for the fuel injector having a period based on the estimated fuel temperature.

19. The method of claim 8, wherein controlling the fuel injector includes controlling a pressure of fuel supplied to the fuel injector based on the estimated fuel temperature.

20. The method of claim 8, wherein controlling the fuel injector includes increasing an amount of fuel injected by the fuel injector when the estimated fuel temperature is greater than a first threshold, and decreasing the amount of fuel injected by the fuel injector when the estimated fuel temperature is less than a second threshold, wherein the second threshold is less than the first threshold.

* * * * *